(12) United States Patent
Solow

(10) Patent No.: US 10,099,635 B2
(45) Date of Patent: Oct. 16, 2018

(54) WIRELESS REMOTE CONTROLLED ELECTRONIC SYSTEM FOR A VEHICLE

(71) Applicant: WOLO MFG. CORP., Deer Park, NY (US)

(72) Inventor: Stanley Solow, Plainview, NY (US)

(73) Assignee: WOLO MFG. CORP., Deer Park, NY (US)

( * ) Notice: Subject to any disclaimer, the term of this patent is extended or adjusted under 35 U.S.C. 154(b) by 0 days.

(21) Appl. No.: 14/873,360

(22) Filed: Oct. 2, 2015

(65) Prior Publication Data

US 2016/0231740 A1    Aug. 11, 2016

Related U.S. Application Data

(60) Provisional application No. 62/092,391, filed on Dec. 16, 2014.

(51) Int. Cl.
| | | |
|---|---|---|
| G08C 17/00 | (2006.01) | |
| G06F 7/04 | (2006.01) | |
| B60R 16/023 | (2006.01) | |
| H05B 37/02 | (2006.01) | |
| G05D 1/00 | (2006.01) | |

(52) U.S. Cl.
CPC ....... *B60R 16/023* (2013.01); *H05B 37/0272* (2013.01); *G05D 1/00* (2013.01)

(58) Field of Classification Search
None
See application file for complete search history.

(56) References Cited

U.S. PATENT DOCUMENTS

| | | | | |
|---|---|---|---|---|
| 5,623,245 | A * | 4/1997 | Gilmore | B60R 25/04 307/10.2 |
| 6,798,336 | B2 * | 9/2004 | Kanda | G07C 9/00309 307/10.5 |
| 7,221,256 | B2 * | 5/2007 | Skekloff | B60R 25/24 340/5.22 |
| 7,684,570 | B2 * | 3/2010 | Riggs | G11B 19/027 340/12.53 |
| 8,193,903 | B2 * | 6/2012 | Kraimer | B66F 9/07581 340/4.3 |
| 8,841,987 | B1 * | 9/2014 | Stanfield | G07C 9/00896 340/5.61 |
| 9,306,743 | B2 * | 4/2016 | Ho | G07C 9/00007 |
| 2010/0063670 | A1 * | 3/2010 | Brzezinski | H04L 67/1095 701/31.4 |
| 2010/0123564 | A1 * | 5/2010 | Grunhold | B60R 25/10 340/426.14 |
| 2011/0144820 | A1 * | 6/2011 | Trauer | G08C 17/02 700/295 |

(Continued)

*Primary Examiner* — Thomas G Black
*Assistant Examiner* — Demetra R Smith-Stewart
(74) *Attorney, Agent, or Firm* — Andrew F. Young, Esq.; Lackenbach Siegel, LLP

(57) ABSTRACT

The disclosure relates to systems, devices, and methods for wirelessly actuating a component of a vehicle such that it is selectively transitionable between an on condition and an off condition. The systems and devices may include a receiver and a remote transmitter. The receiver may be electrically coupled to the vehicle component within a first compartment of the vehicle and the remote transmitter may be mounted within another compartment of the vehicle that is physically isolated from the first compartment while still being wirelessly paired to one another.

11 Claims, 4 Drawing Sheets

(56) References Cited

U.S. PATENT DOCUMENTS

| | | | |
|---|---|---|---|
| 2013/0332007 A1* | 12/2013 | Louboutin | H04W 4/021 |
| | | | 701/2 |
| 2015/0191943 A1* | 7/2015 | Tieman | E05B 81/00 |
| | | | 292/195 |
| 2015/0193030 A1* | 7/2015 | Grover | B60K 37/06 |
| | | | 701/36 |

* cited by examiner

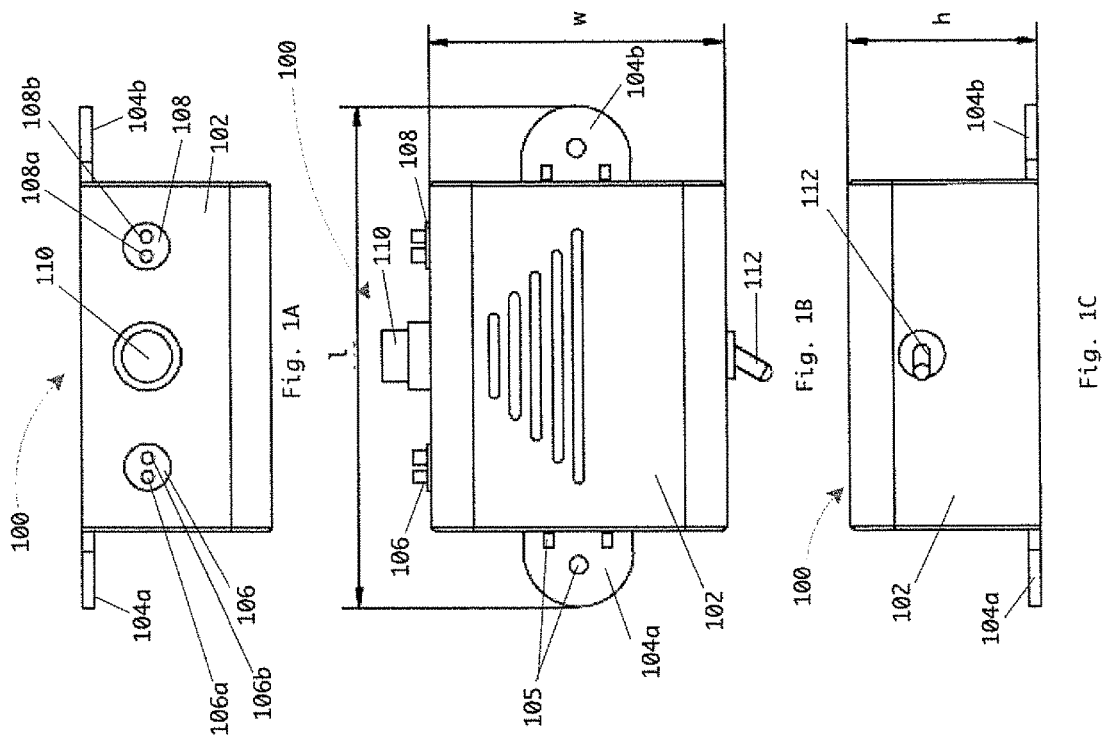
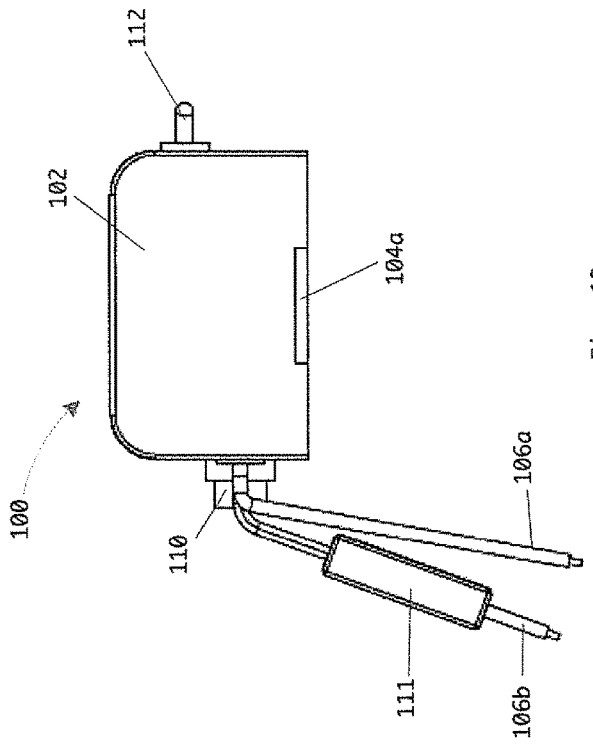

US 10,099,635 B2

WIRELESS REMOTE CONTROLLED ELECTRONIC SYSTEM FOR A VEHICLE

CROSS REFERENCE TO RELATED APPLICATIONS

This application relates to and claims priority from U.S. Prov. Ser. No. 62/092,391 filed Dec. 16, 2014, the entire contents of which are incorporated herein by reference.

BACKGROUND OF THE INVENTION

Field of the Invention

The present invention relates generally to a wireless remote controlled electronic system for a vehicle, and more particularly to an electronic system for remotely controlling components, e.g., a horn and/or lights, of a vehicle.

Description of the Related Art

For many, cars are more than a means of transportation; they are part of one's self-image. However, given today's mass-produced cookie-cutter cars imbuing a car with one's personality is not an easy task.

Lack of personalization options from car manufacturers hasn't stopped those with the desire, cash, and skill to install accessories (e.g., designer wheels, musical horns, etc.), from adding and modifying various components of their automobiles, thereby injecting some much-needed personality. Such individuals have turned the aftermarket automotive accessory market into an industry that is estimated to be worth over $300 billion, and the demand for after-market automotive accessories is steadily increasing.

Some accessories, particularly those that are electrical, require a level technical know-how to successfully and safely install. Given the difficulty of installing such accessories, some of those who may desire such accessories may be deterred from installing those accessories. For example, for devices that need to be actuated when inside or driving the vehicle, such as a car horn, a light, a physical electrical connection conventionally needs to be established to actuate the device. For example, typically if a car horn that is to be used while driving the car is installed, the horn may be located within the engine compartment. To turn on or turn off the device, electrical wiring would need to run through the firewall such that the wiring connects an actuator within the passenger compartment with the device within the engine compartment. Drilling through the firewall is difficult and may pose a safety hazard since doing so might compromise its integrity.

Consequently, a continuing need exists for accessories for vehicles (e.g., cars, boats, etc.) that are more easily and readily installed without necessitating complicated wiring.

SUMMARY OF THE INVENTION

The present disclosure generally relates to a wireless remote control system, devices, and methods for wirelessly actuating a component of a vehicle such that the component is selectively transitionable between an on condition and an off condition. The component may be wirelessly actuated while the vehicle is being driven. Disclosed herein are systems, devices, and methods for wirelessly actuate a component of a vehicle such that it is selectively transitionable between an on condition and an off condition. The systems and devices may include a receiver and a remote transmitter. The receiver may be electrically coupled to the vehicle component within a first compartment of the vehicle and the remote transmitter may be mounted within another compartment of the vehicle that is physically isolated from the first compartment while still being wirelessly paired to one another. Embodiments of such systems, devices, and methods are disclosed herein.

The system may include devices including the receiver and the remote transmitter. The receiver may include a processor unit configured to process an instruction from a receipt of a radio signal transmitted from the remote transmitter and to selectively operate in one of two modes. The two modes may include: (a) a first mode in which the component remains in the on condition while the radio signal is being transmitted and is transitioned to the off condition when receipt of the radio signal is interrupted; and (b) a second mode in which the component remains in the on condition once the instruction from the radio signal has been received and only transitioned to the off condition once the radio signal is once again transmitted.

The wireless remote control device may be configured to actuate a component of a vehicle having an engine compartment and a passenger compartment. The device may include a receiver including a processor unit configured to process an instruction from a receipt of a radio signal transmitted from the remote transmitter and to selectively operate in one of two modes. The two modes may include: (a) a first mode in which the component remains in the on condition while the radio signal is being transmitted and is transitioned to the off condition when receipt of the radio signal is interrupted; and (b) a second mode in which the component remains in the on condition once the instruction from the radio signal has been received and only transitioned to the off condition once the radio signal is once again transmitted. The receiver may be physically contained within the engine compartment and may be physically isolated from the passenger compartment of the vehicle. The wireless remote control device may further include a separate remote transmitter, and wherein the remote transmitter may be configured to be paired with the receiver.

The receiver may include a relay that is configured to send an appropriate amount of power to the component from a power source. The remote transmitter may include an internal power source. Furthermore, the remote transmitter may be configured to transmit a plurality of radio frequencies and the receiver may be programmed to be paired with the remote transmitter such that it recognizes a radio frequency code of the remote transmitter, thereby pairing the transmitter and the receiver.

The remote transmitter including an actuator and a transmitter circuit, wherein when the actuator is actuated the transmitter circuit is configured to transmit the radio signal. The vehicle may include an engine and passenger compartments. The component may be coupled to the receiver and may be physically isolated from the transmitter, that is without having to be directly electrically coupled to the transmitter such that direct wiring need not be installed through a firewall separating the engine and passenger compartments of the vehicle. To wit, the receiver may be mounted within the engine compartment and the transmitter may be mounted within the passenger compartment.

A method of using the system and devices may include mounting the devices of the above described system at desired locations within the vehicle, pairing a remote transmitter with the receiver such that the radio signal is transmittable from the remote transmitter to the receiver, selecting one of the two modes, mounting the processor unit within an engine compartment of the vehicle, electrically connecting the receiver to a power source of the vehicle, placing the remote transmitter within the vehicle, and using the remote transmitter to transmit the radio signal to the receiver to selectively actuate the component. The method may further include selecting one of a plurality of radio frequencies to be transmitted by the remote transmitter, and programming the receiver to be paired with the remote transmitter such that transmission of the one of the plurality of radio frequencies selectively causes component to be turned on or to be turned off.

The above and other aspects, features and advantages of the present disclosure will become apparent from the following description read in conjunction with the accompanying drawings, in which like reference numerals designate the same elements.

BRIEF DESCRIPTION OF THE DRAWINGS

A further understanding of the present invention can be obtained by reference to a preferred embodiment set forth in the illustrations of the accompanying drawings. Although the illustrated preferred embodiment is merely exemplary of methods, structures and compositions for carrying out the present invention, both the organization and method of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the following drawings in which:

FIG. 1A is a back view of a receiver in accordance with an embodiment of the present disclosure.

FIG. 1B is a top view of the receiver of FIG. 1A.

FIG. 1C is a front view of the receiver of FIG. 1A.

FIG. 1 D is a side view of the receiver of FIG. 1A.

DETAILED DESCRIPTION OF THE PREFERRED EMBODIMENTS

Figure 2:
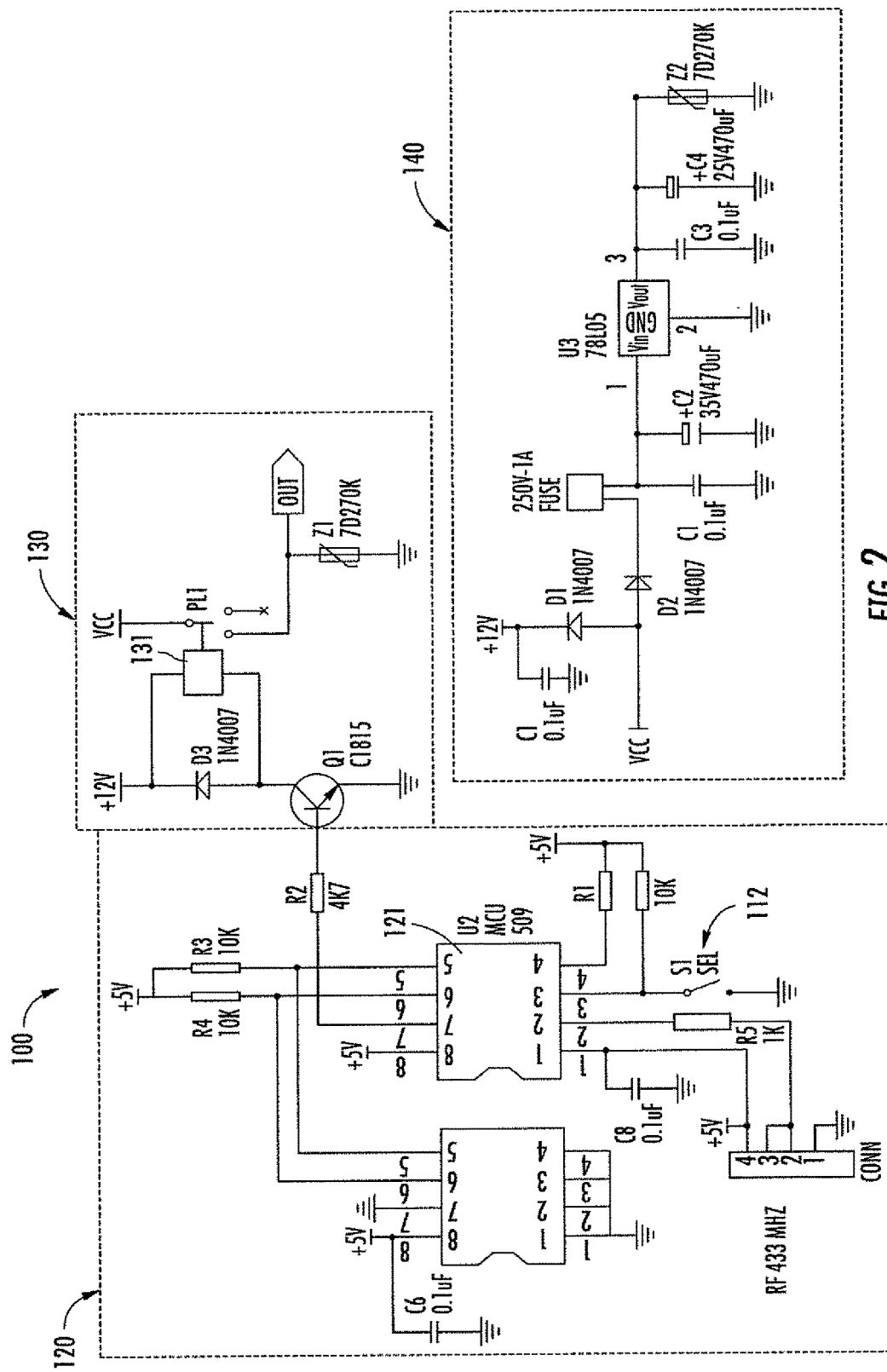
FIG. 2 is a schematic diagram depicting the circuitry of the receiver of FIGS. 1A-D.
Figure 3A:
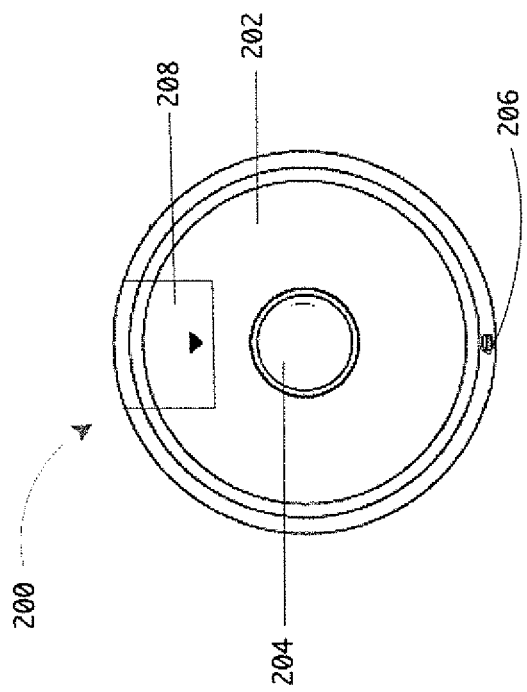
FIG. 3A is a top view of a remote transmitter in accordance with an embodiment of the present disclosure.
Figure 3B:
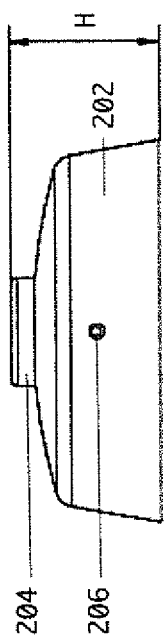
FIG. 3B is a front view of the remote transmitter of FIG. 3A.

As required, a detailed illustrative embodiment of the present invention is disclosed herein. However, techniques, systems, compositions and operating structures in accordance with the present invention may be embodied in a wide variety of sizes, shapes, forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention.

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, up, down, over, above, below, etc., or motional terms, such as forward, back, sideways, transverse, etc. may be used with respect to the drawings. These and similar directional terms should not be construed to limit the scope of the invention in any manner.

Figure 4:
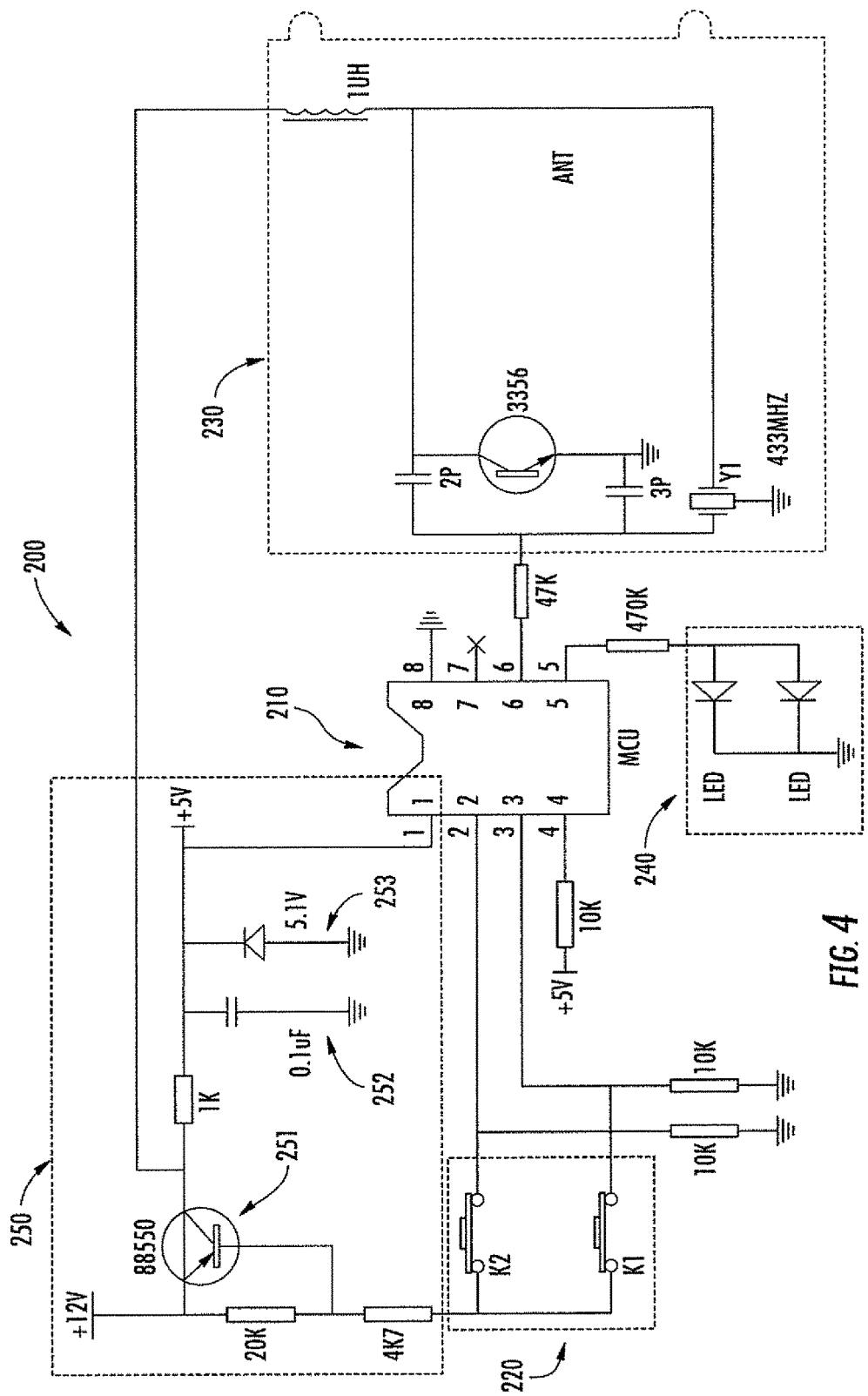
FIG. 4 is a schematic diagram depicting the circuitry of the remote transmitter of FIG. 3A-B.

A universal wireless remote control system is described herein with reference to FIGS. 1A-4. The system includes a receiver 100 (FIGS. 1A-1D) having circuitry as depicted in FIG. 2, and a remote transmitter 200 (FIGS. 3A-3B) having circuitry as depicted in FIG. 4. The receiver 100 may be configured to be electrically coupled to one or more electrical accessories or components (not shown) of a vehicle or vessel such that electrical power can be selectively supplied to the one or more electrical accessories or components, and to wirelessly receive signals which determine whether or not such electively power is supplied.

The receiver 100, as shown in FIG. 1A, may include a housing 102 which may be generally shaped as a rectangular prism having a length 1, a width w, and height h, and may include one or more anchor members 104a and 104b extending from the housing. The anchor members 104a and 104b which may include one or more apertures 105 (FIG. 1B) through which securing members (e.g., screws) (not shown) may be inserted to facilitate securing of the housing 102 to a surface of the vehicle (e.g., a surface within the engine compartment). Alternatively, an adhesive may be used to facilitate securing of the housing 102 to a surface of the vehicle (e.g., a surface within the engine compartment).

The receiver 100 may include a power inlet 106 that is accessible through the housing 102, and includes a negative lead 106a and a positive lead 106b to which a fuse 111 may be electrically coupled (FIG. 1D). The power inlet 106 may be connected to a power source having a voltage, e.g., 12V. The receiver 100 may further include a power outlet 108 accessible through the housing 102. The outlet 108 may include a negative lead 108a and a positive lead 108b to provide electrical power to a component or accessory (e.g., a horn and/or lights). A fuse 110 (e.g., a I-AMP Type GMA fuse), which is configured to protect the circuitry, may be accessible through the housing 102. As shown in FIG. 1C, the receiver 100 a switch 112 may be accessible through the housing, and may facilitate selection between two modes: (a) a first accessory (e.g., lights) on/off mode in which upon the receiver receiving a signal, the accessory may be actuated or selectively turned on; and (b) a second accessory (e.g., a horn) on/off may be actuated or selectively turned on.

A schematic depicting the circuitry of the receiver 100, as shown in FIG. 2, will now be described. It is to be understood that while a specific embodiment of the circuitry of the receiver 100 is shown, the specific values of the circuitry (e.g., voltage, resistor, etc.) is not meant to limit the scope of the disclosure. The receiver 100 may include a processor unit 120, a relay 130, and a voltage regulator 140, which has a safety function to protect the circuitry by reducing the voltage, e.g., from 12V to 5V. The processor unit 120 may include one or more microcontroller units 121 (MCUs) that control the operation of the receiver 100. The MCU 121 may be operatively coupled to an antenna via a connector. The antenna may operate, for example, at a frequency of 433 MHz and may have a range of approximately 150 ft. When the antenna receives a signal, the microcontroller is configured to send an electrical signal via the relay 130 to an appropriate output, e.g., horns or lights.

The relay 130 functions as a single pole, single throw on/off switch, and is configured to receive a voltage, e.g., 12V, from for example the battery of the vehicle that selectively is transmitted to the carts horn and/or other components desired to be actuated. The relay may include an interface 131 that may have, for example, a value of 30, 20, or 10 A (amperes), and may regulate high voltage and/or current to output an appropriate power voltage and/or current to the desired component and/or accessory (e.g., car horn and/or lights).

The remote transmitter 200 may be configured to be programmed to wirelessly communicate with the receiver 100. In particular, the transmitter 200 may include a housing 202 enclosing internal circuitry (FIG. 4), an activation button 204 which may be depressed in a direction along the height H of the transmitter, a button 206 which may be depressed to initiate a programming sequence such that the transmitter may learn a code for wirelessly communicating with the receiver 100. One or more LED's (indicator unit 240 (FIG. 4)) may be lit when at least one of the buttons 204 and 206 actuates a function of the transmitter 200. A door 208 may be slidable relative to a chamber formed in the housing 202 such that an internal power source, e.g., a battery, may be placed therein and connected to the circuitry.

A schematic depicting the circuitry of the remote transmitter 200, as shown in FIG. 4, will now be described. The remote transmitter 200 may include a microcontroller unit (MCU) 210, an actuator unit 220, a transmitter circuit 230, an indicator unit 240, and a voltage regulator 250. The voltage regulator 250 provides a safety function and may be configured to regulate the voltage. The voltage regulator 250 may include a transistor 251 for voltage regulation, a transient suppressor 2151 to prevent voltage spikes, and a vener diode 253 to protect the MCU 210 such that the inputted voltage, e.g., 12V from a power source such as a battery, is maintained at or below a lower voltage, e.g., 5V.

The MCU 210 may be programmed to execute the various operations of the transmitter 200, such as providing electrical power to the indicator unit 240 and/or to the transmitter circuit 230 upon an appropriate signal from the actuator unit 220. The actuator unit 220 may include a first button switch K1 and a second button switch K2 one of which is linked to button 204 and the other to button 206. When actuated, a signal is sent to the indicator unit 240 and/or the transmitter circuit 230. The transmitter circuit 230 includes circuitry for transmitting a signal, e.g., over a radio frequency over a frequency that may be 433 MHz. to the receiver 100.

Installation and use of the system including the receiver 100 and the transmitter 200 are now described.

As discussed above, the receiver 100 may include one or more anchor members 104*a* and 104*b*. Once a desired mounting location for the receiver 100, preferably somewhere close to the component (e.g., a car horn) to which the receiver 100 is to be operatively connected, is determined, the receiver 100 may be mounted by securing the members 104*a* and 104*b* to a surface via screws (not shown) or by a suitable adhesive. The receiver 100 should preferably be mounted in a dry location. If the receiver 100 is mounted in the engine compartment, the receiver should be safe from the engine's exhaust heat and moving parts. The housing 102 and the apertures 105 may be used as a template to mark the locations on the surface such that holes may be drilled to size. Thereafter, the receiver 100 may be mounted and secured to the surface at the desired location and position.

When electrically connecting the receiver 100 to the horn or accessory, wires 108*a*, 108*b* from outlet 108 may be electrically connected to the horn or accessory to the device to be remotely and selectively turned on/off. The wire from the positive terminal or post 108*b* may be connected to a positive terminal or post on the desired component or accessory and the wire extending from the negative terminal or post 108*a* may be connected to a negative terminal or post on the desired component or accessory. If the desired component does not have a polarity, the wires 108*a*, 108*b* may be connected to either electrical terminal of the component.

When electrically connecting the receiver 100 to a power source (e.g., a 12V power source such as the vehicle's battery (not shown)), the negative wire 106*a* of the inlet 106 may be electrically connected to ground by securing the negative wire 106*a* under any metal body bolt or the negative battery post and the positive wire 106*b* may be connected to a positive 12V power source such as the fuse block (not shown) or the positive battery post of the vehicle's battery. Fuse 111 may contain the interface 131 may have a value of 15, 20, or 25 A (amperes), and should preferably be in relatively close proximity (e.g., within 10 inches) to the power source.

The transmitter 200 may be paired with the receiver 100 via a self-learning technology such that the receiver 100 is configured to identify the coded radio signal of the transmitter 200 when using the system for the first time. When the programming is completed, the receiver 100 will lock the coded signal into its memory such that the receiver is only controlled by the transmitter 200. A sequence for programming the receiver 100 to recognize only the radio signal of the transmitter 200 will now be described. The switch 112 may be positioned in either of its positions for actuating either first component such as the horn or the second component such as the lights. The programming button 206 of the transmitter 200 may be pressed and the component actuator button 204 may be pressed. The programming button may be released upon receipt of an indication from an LED of the visual indicator unit 240 of the transmitter 200. Once seeing the visual indication, the programming button 206 may be released and the transmitter 200 is now programmed to work with the receiver 100.

The transmitter 200 may be mounted on a flat surface within the vehicle such as via an adhesive tape or material and/or VELCRO tape. Preferably, the transmitter 200 should not be placed in any location that may interfere with the vehicle's operation, impair visibility, or in the path of an air bag. Advantageously, since the transmitter 200 communicates wirelessly with the receiver 100 such that the transmitter 200 may be placed within the passenger compartment vehicle and the receiver 100 may be placed within the engine compartment, wiring through the firewall of the vehicle separating the passenger and engine compartments of the vehicle is not required.

During use, as discussed above, the receiver may be set to one of two operating modes: (a) a first accessory (e.g., lights) on/off mode in which upon the receiver receiving a signal, the accessory may be actuated or selectively turned on; and (b) a second accessory (e.g., a horn) on/off may momentarily actuated or selectively turned on just when the signal is being received. That is, when in mode (a), the accessory may remain on until the button 204 is pressed once again, and when in mode (b), the accessory may remain on momentarily, that is during the time when the button 204 is being pressed and may turn off once the button 204 is released. Furthermore, selection of a particular mode of operation may also determine which accessory is selectively turned on/off by actuation of the button 204. For example, momentary actuation of particular devices as in mode "b" may be desirable for a car horn such that it only sounds when the button 204 is being pressed, whereas a more continuous on status of an accessory may be desireable for car lights such as they remain on unless the user turns them off as would be the case in mode "a". The transmitter may also provide a visual indication that a radio signal has been sent, for example, by lighting an illumination source, e.g., an LED, such that the user has confirmation of the transmission of the signal from the transmitter to the receiver.

In the claims, means or step-plus-function clauses are intended to cover the structures described or suggested herein as performing the recited function and not only structural equivalents but also equivalent structures. Thus, for example, although a nail, a screw, and a bolt may not be structural equivalents in that a nail relies on friction between a wooden part and a cylindrical surface, a screw's helical surface positively engages the wooden part, and a bolt's head and nut compress opposite sides of a wooden part, in the environment of fastening wooden parts, a nail, a screw, and a bolt may be readily understood by those skilled in the art as equivalent structures.

Having described at least one of the preferred embodiments of the present invention with reference to the accompanying drawings, it is to be understood that such embodiments are merely exemplary and that the invention is not limited to those precise embodiments, and that various changes, modifications, and adaptations may be effected therein by one skilled in the art without departing from the scope or spirit of the invention as defined in the appended claims. The scope of the invention, therefore, shall be defined solely by the following claims. Further, it will be apparent to those of skill in the art that numerous changes may be made in such details without departing from the spirit and the principles of the invention. It should be appreciated that the present invention is capable of being embodied in other forms without departing from its essential characteristics.

What is claimed is:

1. A wireless remote control system configured to wirelessly actuate an aftermarket component of a passenger vehicle including a passenger compartment and an engine compartment, the system comprising:
    a receiver configured to be placed in the engine compartment and a remote transmitter configured to be secured and operated in the passenger compartment to effect actuation of the aftermarket component,
    wherein said receiver comprises:
        a processor unit configured to process an instruction from a receipt of a radio signal transmitted from the remote transmitter and to selectively operate in one of two modes, each of the two modes being operationable while the remote transmitter is within the passenger compartment, the two modes including a first mode in which the component remains in the on condition while the radio signal is being transmitted and is transitioned to the off condition when receipt of the radio signal is interrupted and a second mode in which the component remains in the on condition once the instruction from the radio signal has been received and only transitioned to the off condition once the radio signal is once again transmitted; and
    wherein said remote transmitter comprising:
        an actuator; and
        a transmitter circuit, wherein when the actuator is actuated the transmitter circuit is configured to transmit the radio signal, and
    wherein the component of the vehicle is selectively transitionable between an on condition and an off condition upon receipt of the radio signal by the receiver while the vehicle is being driven, and wherein the aftermarket component is located outside of the passenger compartment.

2. The system of claim 1, wherein the receiver further comprises a relay configured to send an appropriate amount of power to the component from a power source.

3. The system of claim 1, wherein the remote transmitter further comprises an internal power source.

4. The system of claim 1, wherein the receiver is programmable to be paired with the remote transmitter such that it recognizes a radio frequency code of the remote transmitter.

5. The system of claim 4, wherein one of a plurality of radio frequency codes is selectable to be transmitted to the receiver.

6. The system of claim 4, wherein the receiver further comprises a visual indictor to provide an indication of a status.

7. The system of claim 6, wherein the status is a confirmation of the pairing of the remote transmitter and the receiver.

8. The system of claim 1 wherein the receiver is physically isolated from the remote transmitter when the receiver is installed in the vehicle, and wherein the receiver is wirelessly connected to the transmitter.

9. A method of wirelessly actuating an aftermarket component of a passenger vehicle including a passenger compartment and an engine compartment, comprising:
    providing a receiver;
    connecting a receiver to the component within the engine compartment, the receiver comprising;
        a processor unit configured to process an instruction from a receipt of a radio signal transmitted from the remote transmitter and to selectively operate in one of two modes, the two modes including a first mode in which the component remains in the on condition while the radio signal is being transmitted and is transitioned to the off condition when receipt of the radio signal is interrupted and a second mode in which the component remains in the on condition once the instruction from the radio signal has been received and only transitioned to the off condition once the radio signal is once again transmitted;
    providing a remote transmitter configured to be secured and operated in the passenger compartment and pairing the remote transmitter with the receiver such that the radio signal is transmittable from the remote transmitter to the receiver;
    selecting one of the two modes, wherein both of the two modes are operationable while the remote transmitter is within the passenger compartment;
    mounting the processor unit within the engine compartment of the vehicle;
    electrically connecting the receiver to a power source of the vehicle;
    placing the remote transmitter within the vehicle; and
    using the remote transmitter to transmit the radio signal to the receiver to selectively actuate the component,
    wherein the aftermarket component is located outside of the passenger compartment.

10. The method of claim 9, further comprising;
    selecting one of a plurality of radio frequencies to be transmitted by the remote transmitter; and
    programming the receiver to be paired with the remote transmitter such that transmission of the one of the plurality of radio frequencies selectively causes component to be turned on or to he turned off.

11. A wireless, remote control device configured to actuate a component of a vehicle having an engine compartment and a passenger compartment, the device comprising:
- a remote transmitter configured to be secured and operated within the passenger compartment; and
- a receiver including a processor unit configured to process an instruction from a receipt of a radio signal transmitted from the remote transmitter, which is in the passenger compartment to selectively operate a first mode and a second mode, the first mode being when the component remains in the on condition while the radio signal is being transmitted and is transitioned to the off condition when receipt of the radio signal is interrupted and the second mode being when the component remains in the on condition once the instruction from the radio signal has been received and only transitioned to the off condition once the radio signal is once again transmitted,
- wherein the receiver is physically contained within the engine compartment and is physically isolated from the passenger compartment of the vehicle,
- and wherein the component is located outside of the passenger compartment.

* * * * *